United States Patent [19]

Bege et al.

[11] Patent Number: 4,974,335

[45] Date of Patent: Dec. 4, 1990

[54] METHOD AND APPARATUS FOR DRYING SEWAGE SLUDGE

[75] Inventors: Dietmar Bege; Siegfried Meininger, both of Erlangen, Fed. Rep. of Germany

[73] Assignee: Siemens Aktiengesellschaft, Munich, Fed. Rep. of Germany

[21] Appl. No.: 356,377

[22] Filed: May 24, 1989

[30] Foreign Application Priority Data

May 24, 1988 [DE] Fed. Rep. of Germany ....... 3817609

[51] Int. Cl.$^5$ ............................................. F26B 7/00
[52] U.S. Cl. .......................................... 34/17; 34/60; 34/35; 34/86
[58] Field of Search ..................... 34/34, 73, 74, 133, 34/130, 33, 17, 60

[56] References Cited

U.S. PATENT DOCUMENTS 3,805,715  4/1974  Keller .
3,953,927  5/1976  Hoffert .

FOREIGN PATENT DOCUMENTS 0088174  9/1983  European Pat. Off. .
 278860  10/1914  Fed. Rep. of Germany .
2902323  7/1979  Fed. Rep. of Germany .
2929486  1/1981  Fed. Rep. of Germany .
1176841  4/1959  France .
  95364  7/1922  Switzerland .
2135034  8/1984  United Kingdom .

*Primary Examiner*—Henry A. Bennet
*Attorney, Agent, or Firm*—Herbert L. Lerner; Laurence A. Greenberg

[57] ABSTRACT

A method and apparatus for drying sewage sludge includes diverting steam escaping during the drying of the sewage sludge and feeding the steam to a compressor. Thermal energy of the compressed and therefore heated steam is supplied to the sewage sludge to be dried through a heat exchanger system. Condensate is drawn off from the heat exchanger system and collected. Thermal energy of the condensate is supplied to the sewage sludge prior to the drying for reinforcing a preliminary degassing.

11 Claims, 1 Drawing Sheet

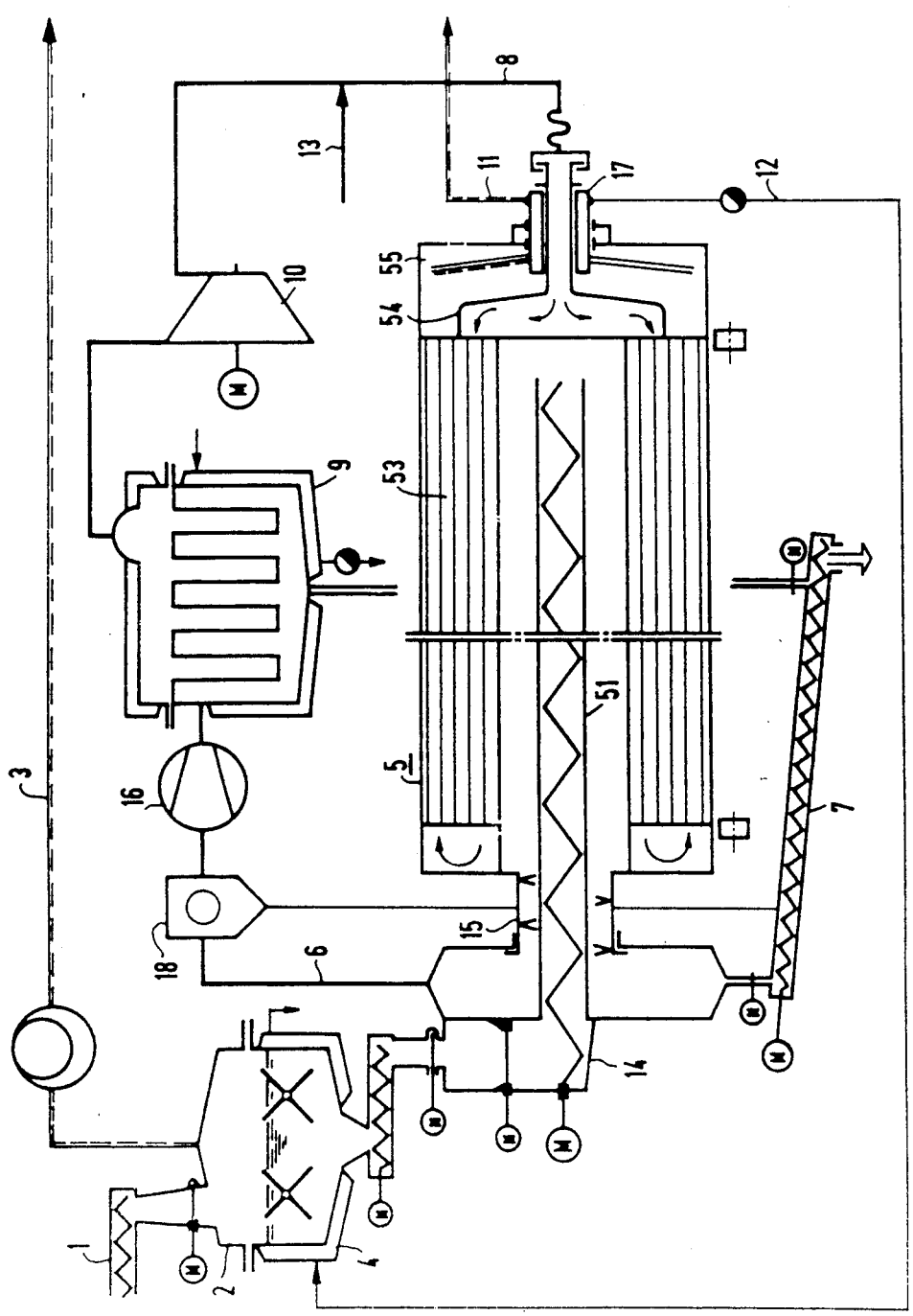

METHOD AND APPARATUS FOR DRYING SEWAGE SLUDGE

The invention relates to a method and apparatus for drying sewage sludge, in which steam that escapes when the sewage sludge is dried is diverted and fed to a compressor, and thermal energy from the compressed and therefore heated steam is supplied to the sewage sludge to be dried through a heat exchanger system, where condensate is diverted.

Both community and industrial sewage treatment plants produce sewage sludge, which must be disposed of. In the past, sewage sludge was spread as fertilizer on fields used for agriculture. This usage is prohibited for sewage sludge that has a high toxic content. Mercury, cadmium and lead, for instance, are found in sewage sludge. Storing sewage sludge in dumps presents problems, because large quantities of sewage sludge contribute to destabilizing the dump body. A very great number of dumps is therefore required.

One suitable solution for disposing of sewage sludge is to produce oil and fatty acids from sewage sludge. Other solutions are combustion and other processes. For this purpose, the sewage sludge, which has a high water content, must first be dried. Mechanical dewatering is not sufficient to obtain a combustible substance. The special furnaces which are known therefore require the addition of substances having a high calorific value, or even primary fuel, to the dewatered sludge to make combustion even possible at all. The calorific value of the prepared sludge available thus far is inadequate for combustion.

The use of sewage sludge for oil recovery also requires prior drying.

It is accordingly an object of the invention to provide a method and apparatus for drying sewage sludge, which overcome the hereinafore-mentioned disadvantages of the heretofore-known methods and devices of this general type and which permits extensive drying of sewage sludge in a simple manner, without the addition of extra fuel. The dried composition is intended to be readily combustible with simple means and without adding combustible substances, solely as the result of its own calorific value.

With the foregoing and other objects in view there is provided, in accordance with the invention, a method for drying sewage sludge, which comprises drying sewage sludge, diverting steam escaping during the drying of the sewage sludge and feeding the steam to a compressor, supplying thermal energy of the compressed and heated steam to the sewage sludge to be dried through a heat exchanger system, drawing off condensate from the heat exchanger system, collecting the condensate, and supplying thermal energy of the condensate to the sewage sludge prior to the drying for reinforcing a preliminary degassing.

It is only in this way that the steam escaping in the drying process and then being compressed has an adequate temperature level and a sufficient heat transfer output for heating the sewage sludge.

The drying of the sewage sludge is effected with steam derived from the sludge itself. In order to ensure that the steam will have a necessary high temperature, it is condensed in a compressor and in this way brought to a higher temperature level. In the startup phase of the method and in order to compensate for heat losses, it is possible for fresh steam to be fed in. Condensate that precipitates from the steam after the thermal energy has been given onto the sludge is collected. The thermal energy of the condensate is supplied to the sewage sludge in a preliminary stage of the method before the drying, in order to reinforce a preliminary degassing of the sludge. The thermal energy generated upon compression of the steam thus is additionally used for the preliminary degassing of the sludge.

The advantages obtained with the method according to the invention are that with simple means and virtually without adding additional substances, extensive drying of sewage sludge can be carried out. The dry composition formed from the sewage sludge by the method according to the invention is burnable immediately in conventional combustion systems, without adding fuels. Accordingly, fuels that entail additional cost are unnecessary. With the method for drying sewage sludge according to the invention, economical disposal of sewage sludge without using a dump can be accomplished.

In accordance with another mode of the invention, there is provided a method which comprises separating and combusting combustible gases present in the condensate for the recovery of heat. Therefore, if the condensate includes burnable gases, they are used, for instance, as fuel for combustion or for further drying of the sewage sludge in a drying oven.

With the objects of the invention in view, there is also provided an apparatus for drying sewage sludge, comprising an input gate for sewage sludge, an apparatus for preliminary degassing, such as a kneading reactor, connected to the input gate, a drying reactor, such as a rotary reactor, connected to the apparatus for preliminary degassing, an outlet line connected to the drying reactor, a discharge apparatus for dried sewage sludge connected to the outlet line, an exhaust vent line for emerging steam connected to the drying reactor, the drying reactor including a bank of heat exchanger tubes, a supply line and outlet lines connected to the bank of heat exchanger tubes, and a compressor connected between the exhaust vent line and the supply line, the apparatus for preliminary degassing having a jacket heater, and the outlet lines including a condensate outlet line connected between the drainage line of the bank of heat exchanger tubes and the jacket heater.

After the compressed steam has flowed through the heat exchanger tubes and has given up thermal energy to the sewage sludge in the drying reactor, the steam temperature still is between 120° C. and 160° C. The condensate produced, at a temperature of up to 100° C., then passes through the condensate line to the jacket heater of the preliminary degassing apparatus. As a result, the drying reactor is supplied with largely degassed sewage sludge heated approximately to 60° C.

This has the advantage of ensuring that sewage sludge is sufficiently well dried without the addition of outside fuels.

In accordance with another feature of the invention, the drying reactor is a rotary reactor having two ends and an input tube spaced from the bank of heat exchanger tubes defining interspaces therebetween, the input tube and the interspaces defining a system to be axially supplied with sewage sludge from one of the ends of the rotary reactor, and the heat exchanger tubes of the bank being axially supplied with compressed steam in pairs from the other of the ends of the rotary reactor. The sewage sludge passes from one end of the rotary reactor into the input tube, is moved through the input tube, and reaches the same end once again in countercurrent through the interspaces between the input tube and the bank of tubes. There, the interspaces communicate with the discharge apparatus for dried sewage sludge and with the exhaust vent line for emerging steam. The discharge apparatus discharges the dried product, which can, for instance, be taken to a garbage incineration plant. The product may also be supplied to a low-temperature carbonization process, or may act as raw material for the recovery of oil from sewage sludge. The heat exchanger tubes in the rotary reactor should be supplied with compressed steam from the other end of the rotary reactor. The steam reaches the heat exchanger tubes point through the exhaust vent line and the compressor. The heat exchanger tubes should be supplied with compressed steam in pairs in countercurrent. Once thermal energy has been given up to the sewage sludge, inert gas and condensate formed from the steam reach the same end of the rotary reactor at which the steam is supplied and leave the rotary reactor once again. The advantage of a rotary reactor of this kind is that good heat transfer from the compressed steam to the sewage sludge takes place. The rotation of the rotary reactor, which is made possible by the inlet and outlet lines located in the axis of rotation, further contributes to this heat transfer.

In accordance with a further feature of the invention, the apparatus for preliminary degassing is a kneading reactor including the jacket heater, a kneading mechanism, supply and outlet lines for sewage sludge and an outlet line for gases. The kneading reactor has mechanical agitator mechanisms and a pump in the outlet line for gases, which generates a technical, practical or mathematical vacuum in the space above the sewage sludge in the kneading reactor. Heating of the sewage sludge takes place through the use of the jacket heater which is, for instance, operated with the condensate of the compressed steam that leaves the drying reactor. The advantage of using the kneading reactor is that the sewage sludge is prepared for the drying reactor by de-gassing and heating, which leads to a much improved drying outcome, because a lesser quantity of inert gases is present in the heating steam which inert gas would disrupt the thermal transfer. The gases diverted through the degassing line include not only air but also hydrocarbons, which are combustible and can therefore be supplied to a combustion system or a drying oven.

In accordance with an added feature of the invention, a mechanical or an electromagnetic filter is disposed upstream of the compressor in the exhaust vent. The filter cleans the steam to be delivered to the compressor, in order to improve the attainable compression.

In accordance with an additional feature of the invention, a steam scrubbing column is disposed upstream of the compressor, instead of a filter.

In accordance with a concomitant feature of the invention, there is provided a fresh steam line discharging into the steam supply line, so that the inlet line for the heat exchanger tubes in the rotary reactor communicates not only with the compressor but also with the fresh steam line.

The advantage of such a construction is that if the steam derived from the sludge itself is inadequate for the drying, then externally obtained steam can be supplied. The supply of externally obtained steam is particularly necessary when the apparatus for drying sewage sludge is initially put into operation.

A cyclone filter is, for instance, disposed in the exhaust vent line, for filtering out entrained solid particles derived from the dried sewage sludge. According to another embodiment, the exhaust vent line is heated in order to prevent condensate formation.

The advantage of the method and apparatus according to the invention is particular that sewage sludge can be prepared for combustion in a manner that is favorable from an energy standpoint.

Other features which are considered as characteristic for the invention are set forth in the appended claims.

Although the invention is illustrated and described herein as embodied in a method and apparatus for drying sewage sludge, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing.

The drawing is a diagrammatic and schematic circuit diagram of an exemplary embodiment of an apparatus according to the invention for drying sewage sludge.

Referring now to the single FIGURE of the drawing in detail, there is seen an input gate 1 for sewage sludge which communicates with an inlet to an apparatus for preliminary degassing, in the form of a kneading reactor 2. An outlet line 3 for gases extends from the kneading reactor 2 into a combustion apparatus. The kneading reactor 2 is equipped with a jacket heater 4. An outlet of the kneading reactor 2 for pre-treated sewage sludge communicates with an inlet line 14 of a rotary reactor 5. In the rotary reactor 5, the sewage sludge enters an input tube 51, which is surrounded by a bank of heat exchanger tubes 53 that are spaced apart from the inlet tube 51. The end of the input tube 51, as seen in flow direction, communicates with interspaces between the input tube 51 and the bank of tubes 53. An outlet line 15 from the rotary reactor 5 communicates with the interspaces and is located at the same end of the rotary reactor 5 as the inlet of the input tube 51, in the vicinity of the axis of the rotary reactor 5. The sewage sludge passes through the input tube 51 and then, in a countercurrent, through the interspaces between the input tube 51 and the bank of tubes 53 to the outlet line 15. Communicating with the outlet line 15 are an exhaust vent line 6 for steam emerging from the sludge and a discharge apparatus 7 for the dried sludge. The bank of heat exchanger tubes 53 in the rotary reactor 5 separates the steam from the sewage sludge in the reactor 5. The heat exchanger tubes of the bank 53 are intended to be supplied with hot compressed steam in pairs by the countercurrent principle, which causes a transfer of heat from the steam to the sewage sludge and thereby dries the sludge.

An inlet line 8 of the bank of tubes 53 for the steam as well as an outlet line 17 of the bank of tubes 53 which is constructed as a sleeve having an annular space, are disposed in the vicinity of the axis of rotation of the rotary reactor 5, facing the inlet line 14 and the outlet line 15 for the sewage sludge. All of the inlet and outlet lines 8, 17, 14 and 15 for the rotary reactor 5 are equipped with gas tight ducts or fittings. The exhaust vent line 6 of the rotary reactor 5 communicates with the steam inlet or supply line 8 of the rotary reactor 5, through a cyclone filter 18, a fan 16, a mechanical or electromagnetic filter or steam scrubbing column 9, and a compressor 10 driven by a motor M. The compressor 10 may be driven by a gas motor driven with fermentation gas, by a turbine or by an electric motor. The selection of the drive depends on local conditions. For instance, fermentation gas can be used to drive the motor in the presence of fermentation towers of a sewage purification plant. The cyclone filter 18 communicates with the discharge apparatus 7. Entrained solid particles are filtered out through the use of the cyclone filter 18. In order to prevent condensate formation, the exhaust vent line 6 may be heated. The steam removed from the sludge in the rotary reactor 5 is cleaned, filtered and compressed in the compressor 10, which causes the pressure and therefore the temperature to increase sharply. The compressed, heated steam gives up thermal energy through the bank of heat exchanger tubes 53, for drying the sludge in the rotary reactor 5. The sleeve 17 having the annular space includes two half-shells. Communicating with the sleeve 17 are a separate inert gas outlet line 11 and a condensate line 12 of the bank of tubes 53 of the rotary reactor 5.

The rotary reactor 5 is disposed on a slant or is conical, so that the sludge in the interspaces between the inlet tube 51 and the bank of tubes 53 is moved solely by the influence of gravity. The sludge is fed into the input tube 51 by means of a feed screw. Feed screws are correspondingly also located in the input gate 1 and in the connection between the kneading reactor 2 and the rotary reactor 5. The system including the input tube 51 and the interspaces between the input tube 51 and the bank of tubes 53 has a slight low pressure as compared with ambient pressure. If necessary, a fresh steam line 13 discharges into the inlet line 8, so that if the steam derived from the sludge itself is inadequate for the drying, then externally obtained steam can be supplied. The supply of externally obtained steam is particularly necessary when the apparatus for drying sewage sludge is initially put into operation. The supply of the compressed steam from the steam supply line 8 into the bank of heat exchanger tubes 53 of the rotary reactor 5 takes place through a steam dome 54, which supplies heat exchanger tubes located on the inside of the rotary reactor 5 with steam. Once the steam has flowed through these heat exchanger tubes, it emerges on the opposite end, is diverted, and passes through outer heat exchanger tubes into a space 55 on the outside of the steam dome 54. Communicating with this space 55 is the sleeve 17 having the annular space, which surrounds the steam supply line 8 in the vicinity of the duct through the wall of the rotary reactor 5. The sleeve 17 having the annular space communicates with the inert gas outlet line 11 and the condensate outlet line 12.

The condensate outlet line 12 supplies the jacket heater 4 of the kneading reactor 2. The temperature of the condensate is sufficient for preliminary degassing of the sewage sludge in the kneading reactor 2. It is only in this way that the condensed steam from the drying attains an adequate temperature level and an adequate heat transfer output of the type required for heating the sewage sludge.

We claim:

1. Method for drying sewage sludge, which comprises preliminarily degassing sewage sludge, subsequently drying the sewage sludge, diverting steam escaping during the drying of the sewage sludge and feeding the steam to a compressor, supplying thermal energy of the compressed and therefore heated steam to the sewage sludge to be dried through a heat exchanger system, drawing off condensate from the heat exchanger system, collecting the condensate, and supplying thermal energy of the condensate to the sewage sludge prior to the drying for reinforcing the preliminary degassing.

2. Method according to claim 1, which comprises separating and combusting combustible gases present in the condensate for the recovery of heat.

3. Apparatus for drying sewage sludge, comprising an input gate for sewage sludge, an apparatus for preliminary degassing connected to said input gate, a drying reactor connected to said apparatus for preliminary degassing, an outlet line connected to said drying reactor, a discharge apparatus for dried sewage sludge connected to said outlet line, an exhaust vent line for emerging steam connected to said drying reactor, said drying reactor including a bank of heat exchanger tubes, a supply line and outlet lines connected to said bank of heat exchanger tubes, and a compressor connected between said exhaust vent line and said supply line, said apparatus for preliminary degassing having an outlet for gas and a jacket heater, and said outlet lines including a condensate outlet line connected between said bank of heat exchanger tubes and said jacket heater.

4. Apparatus according to claim 3, wherein said drying reactor is a rotary reactor, and said apparatus for preliminary degassing is a kneading reactor.

5. Apparatus according to claim 3, wherein said drying reactor is a rotary reactor having two ends and an input tube spaced from said bank of heat exchanger tubes defining interspaces therebetween, said input tube and said interspaces defining a system to be axially supplied with sewage sludge from one of said ends of said rotary reactor, and said hear exchanger tubes of said bank being axially supplied with compressed steam in pairs from the other of said ends of said rotary reactor.

6. Apparatus according to claim 3, wherein said apparatus for preliminary degassing is a kneading reactor including said jacket heater, a kneading mechanism, supply and outlet lines for sewage sludge and an outlet line for gases.

7. Apparatus according to claim 3, including a mechanical filter connected upstream of said compressor.

8. Apparatus according to claim 3, including an electromagnetic filter connected upstream of said compressor.

9. Apparatus according to claim 3, including a steam scrubbing column connected upstream of said compressor.

10. Apparatus according to claim 3, including a fresh steam line discharging into said supply line.

11. Method for converting sewage sludge to a combustible product which comprises supplying first thermal energy to the sewage sludge, thereby degassing the sewage sludge, drying the sewage sludge by applying second thermal energy thereto, diverting steam escaping during the drying of the sewage sludge, feeding the steam to a compressor for compressing and thereby heating the steam, deriving the second thermal energy from the compressed and heated steam, and supplying same to the sewage sludge through a heat exchanger system, drawing off condensate form the heat exchanger system, collecting the condensate, and supplying the thermal energy of the condensate as the first thermal energy to the sewage sludge prior to the drying.

* * * * *